March 19, 1946.  J. F. HYSLER  2,396,851
ELECTRIC CONTROLLING APPARATUS
Filed April 2, 1943
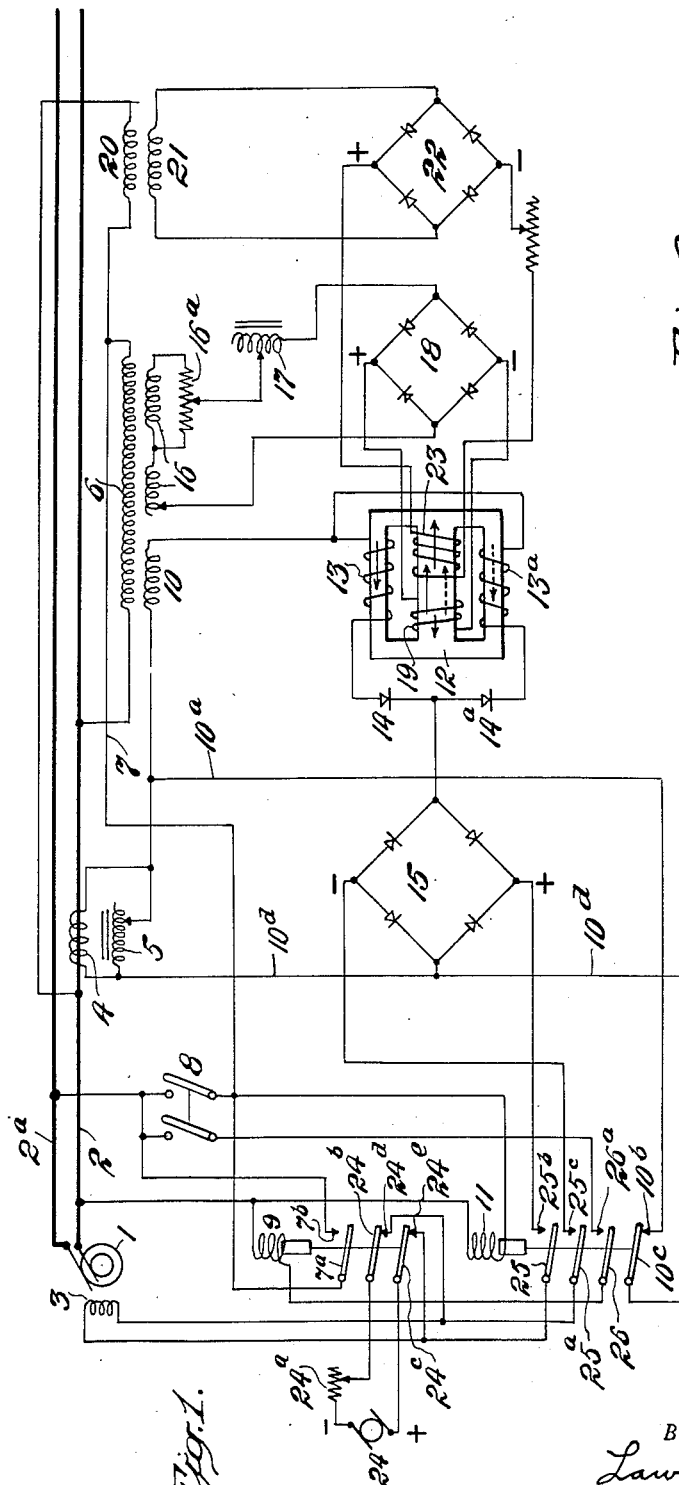
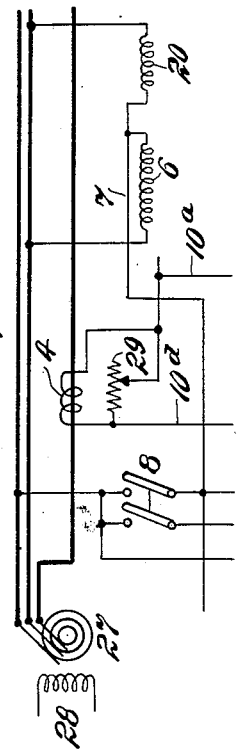
INVENTOR.
JOHN F. HYSLER
BY
Lawrence K. Sager
his ATTORNEY Patented Mar. 19, 1946

2,396,851

UNITED STATES PATENT OFFICE 2,396,851

ELECTRIC CONTROLLING APPARATUS

John F. Hysler, Mount Vernon, N. Y., assignor to Ward Leonard Electric Company, a corporation of New York Application April 2, 1943, Serial No. 481,550

3 Claims. (Cl. 171—119)

This invention relates to regulating apparatus and is applicable particularly to the regulation of the voltage of an alternating current generator supplying a load circuit wherein the power factor may vary considerably over a wide range due to the current lagging or leading with reference to the electromotive force of the generator. It also relates to the method of control.

When the power factor of the load circuit is unity, or near unity, the voltage of the generator may be controlled in a satisfactory manner by controlling the field current over a comparatively small range; but when the power factor is considerably less than unity due to a lagging current, the actions in the generator are such that the current supplied to the field circuit of the generator for maintaining the voltage may necessitate several times the value required under conditions of unity power factor. Moreover, the power factor of the circuit may change from time to time under variable load conditions and require a very large exciting field current under a heavy inductive load, a much smaller current under unity power factor, and still smaller under a load wherein the load current is leading with reference to the electromotive force of the generator.

The present invention is based in one respect upon combining with voltage responsive means a control which is responsive to change of power factor and to change of load with the result that the exciting field current of the generator may be varied widely to maintain the required voltage under the varying conditions.

The main object of the invention is to regulate the voltage of the generator within desired limits regardless of the change of load, power factor, or other variables. Another object is to accomplish this with apparatus having no moving controlling parts, resulting in dependability over long continued used and requiring slight attention or repair. Another object is to utilize devices of comparatively simple form readily available and conveniently assembled. A further object is to provide means for transferring from automatic to manual control, or the reverse, whenever desired, in proper sequence of the circuit changes. Other objects and advantages will be understood from the following description and accompanying drawing showing preferred embodiments of the invention.

Fig. 1 is a diagram showing the invention applied to a single phase system; and Fig. 2 is a diagram showing one application to a three-phase system.

By the present invention an electromotive force having a phase responsive to power factor change is related to or combined with an electromotive force derived from and having a phase related to the phase of the electromotive force of the generator. In the preferred form of the invention these derived electromotive forces are utilized to give a vector sum resultant effect such that the vector sum increases as the lag of the load current increases and decreases as the lead of the load current increases. This is accomplished by providing special means for properly relating the phases of the responsive electromotive forces to each other and for controlling their relative change of phase under the varying conditions.

Referring to Fig. 1, a single phase alternating current generator 1 is indicated supplying the lines 2 and 2a of the load circuit. The field winding 3 of the generator is supplied with direct current which is varied by the control apparatus for maintaining the voltage at the required value.

The voltage responsive to the change of power factor of the load and to the load current is derived from a current transformer 4 related to one of the supply lines. The phase of the current in the winding of this transformer is dependent upon and changes with the phase of the load current in its relation to the phase of the electromotive force of the supply line; and the value of the current in the transformer will correspond with that of the load current. An adjustable impedance device 5 is shown connected across the terminals of the current transformer for the purpose of securing a proper phase relationship of the electromotive force derived therefrom to the phase of another electromotive force related to that of the line voltage. This device is indicated as an inductive winding for the purpose of causing the electromotive force at its terminals to lag in phase a considerable amount, under conditions of unity power factor of the load, with reference to the phase of the electromotive force which is dependent upon the phase of the line voltage. In some cases this impedance device may be in the form of a capacitor or may be a resistive device or various combinations of inductive, resistive or capacitive devices for obtaining the proper phase relationship of the electromotive force derived from the current transformer. This derived electromotive force is combined in proper phase relationship with an electromotive force responsive to change of voltage of the load circuit and having a phase dependent upon the phase of the line voltage.

A transformer having a primary winding 6 is shown connected at one terminal to the line 2 and at the other terminal through the lead 7 to one side of a manual double pole switch 8 which, when closed, connects this terminal to the line 2a. The lead 7 is also connected to a movable contact 7a of a relay having a winding 9. When this relay is energized the contact 7a engages a fixed contact 7b which is directly connected to the line 2a. A secondary winding 10 of the transformer is connected from one terminal directly to a terminal of the impedance device 5 and of the current transformer 4. It is likewise connected by the lead 10a to a fixed contact 10b of a relay having a winding 11. When this winding is deenergized, the contact 10b is engaged by a movable contact 10c which in turn is connected by the lead 10d to the other terminal of the impedance device 5 and current transformer 4.

A reactor 12 is shown having a core of the three-legged type. The outside legs of this core are enveloped respectively by windings 13 and 13a, the right-hand terminals of which are connected to the other terminal of the secondary winding 10. The left-hand terminal of the winding 13 is connected through an electric valve or half-wave rectifier 14 to a terminal of a full wave rectifier 15 indicated as of the bridge-connected copper oxide type, although any other suitable type could be used. The left-hand terminal of the winding 13a is connected through an electric valve or half-wave rectifier 14a to the same terminal of the rectifier 15. However the half-wave rectifiers 14 and 14a are so connected in their leads to the rectifier 15 that an alternating current is supplied to the rectifier 15. That is, when the alternating current from the secondary winding 10 passes in one direction, current will be supplied to the winding 13 and rectifier 14 to the rectifier 15 and when the current passes through the secondary winding 10 and the winding 13a in the opposite direction, current will pass from the rectifier 15 through the rectifier 14a, winding 13a to the transformer 10. The connections to the windings 13 and 13a are made such as to cause their return flux through the middle leg to be in the same direction. The flux path is indicated for example, by the full line arrow on the upper leg and the full line large arrow on the middle leg and by the dotted line arrow on the lower leg and the dotted line large arrow on the middle leg. The terminal of the rectifier 15 opposite that to which the electric valves 14 and 14a are connected, is connected to the lead 10d and thereby to the left-hand terminal of the impedance device 5 and current transformer 4. It will be apparent from these connections that the rectifier 15 is supplied with an electromotive force which is the resultant of the electromotive forces derived from the terminals of the impedance device 5 and current transformer 4 and from the terminals of the secondary winding 10 as modified by the action of the reactor 12; because the circuit supplying these electromotive forces to the rectifier 15 contains these electromotive force producing devices connected in series with each other.

Another secondary winding 16 is related to the primary winding 6 of the transformer for the purpose of deriving therefrom a direct current which will vary widely in response to changes of the electromotive force of the load circuit. A portion of the secondary 16 is bridged by a variable rheostat 16a from which an adjustable connection is made to the winding 17 of an inductive device. Connection therefrom is made to one terminal of a full wave rectifier 18 indicated of the bridge-connected copper oxide type. The opposite terminal of the rectifier 18 is adjustably connected to the other terminal of the secondary winding 16. A winding 19 on the middle leg of the reactor is connected to the positive and negative terminals of the rectifier 18. The magnetizing force of the current of the winding 19 is in a direction to oppose or buck the magnetizing force of the currents of the windings 13 and 13a, as indicated by the small left-hand arrow on the middle leg of the reactor.

Another transformer having a primary winding 20 and a secondary winding 21 has its primary winding connected across the load circuit through the manual switch 8 when the latter is closed. The secondary of this transformer supplies current to a full wave rectifier 22 indicated of the bridge-connected type. Another winding 23 on the middle leg of the reactor is connected to the positive and negative terminals of this rectifier. The magnetizing force of the current of the winding 23, is in such direction as to be cumulative with or in the same direction as the magnetizing force of the currents of the windings 13 and 13a of the reactor, as indicated by the small right-hand arrow on the middle leg. The main purpose of the winding 23 is to bring the magnetization of the core of the reactor to such a region on the magnetization curve that the change of current in the winding 19, due to change of the line voltage, will have a pronounced effect by working the core in a region below the knee of the magnetization curve.

The two relays at the left of Fig. 1 are for the purpose of properly controlling the transfer when desired from automatic control of the generator voltage to manual control, or the reverse. An auxiliary direct current source 24 is indicated as connected through an adjustable resistance 24a to a pair of movable contacts 24b and 24c respectively which engage a pair of fixed contacts 24d and 24e when the relay 9 is deenergized. The fixed contact 24d is connected to one lead from the field winding 3 and the fixed contact 24e is connected to the other lead of the field winding.

The movable contacts 25 and 25a of the relay 11 are respectively connected to the terminals of the field winding 3 of the generator; and when this relay is energized these contacts respectively engage fixed contacts 25b and 25c which are respectively connected to the positive and negative terminals of the rectifier 15. The movable contact 26 of this relay is connected to one terminal of the winding 9 of the other relay, the remaining terminal of winding 9 being connected to the supply line 2. When the winding 11 is energized, the contact 26 will engage the fixed contact 26a which is connected to one pole of the manual switch 8. When this switch is closed, it will energize the relay winding 11 by closing its circuit across the supply lines 2 and 2a. The energization of the relay 11 by the closing of the manual switch results in the subsequent closing of the circuit through the winding 9 of the other relay by a circuit from the supply line 2 through the winding 9 and contacts 26 and 26a and through the switch 8 to the other supply line 2a.

Fig. 1 shows the parts in condition for manual control of the voltage of the generator. The manual switch 8 is then open and the relay windings 9 and 11 are deenergized. The auxiliary direct current source 24 then supplies current to the field winding 3 through the contacts 24b and 24c and through the fixed contacts engaged thereby. The voltage of the generator may be controlled manually by means of the field rheostat 24a which is in series in the field circuit. The movable contact 10c engages the contact 10b during manual control which short-circuits the terminals of the impedance device 5 and current transformer 4 by means of the connecting leads 10a and 10d for the purpose of reducing the voltage which would otherwise be imposed upon the circuit to which the current transformer and impedance device are connected.

When it is desired to transfer to automatic control, the manual switch 8 is closed. This closes the circuit of the primary windings 6 and 20 across the supply lines 2 and 2a through the right-hand contact of the switch 8, thereby imposing operating voltages on the secondary windings of the transformers. The closing of the switch 8 also energizes the relay winding 11 of the lower relay which results in connecting the rectifier 15 to the field winding 3 of the generator through the contacts 25, 25b and 25a, 25c. This results in momentarily connecting the rectifier 15 in parallel with the direct current source 24a and thereby avoids the rupturing of the field circuit.

The energization of the lower relay results in thereafter energizing the upper relay by closing the circuit of the winding 9 through the contacts 26 and 26a and through the switch 8 across the supply line. The energization of the relay 11 also serves to open the circuit between the contacts 10c and 10b thereby permitting the electromotive force derived from the impedance device 5 and current transformer 4 to be imposed upon its circuit.

The energization of the relay winding 9 results in breaking the circuit between the movable contacts 24b, 24c and the fixed contacts 24d, 24e which disconnects the auxiliary direct current source from the circuit of the field winding and permits the automatic control to have its full influence in the control of the field excitation of the generator. The energization of the relay winding 9 also results in causing the movable contact 7a to engage the fixed contact 7b which is connected to the supply line 2a. The purpose of this is to maintain energization of the primary windings 6 and 20 of the potential transformers and also of the relay 11 after the manual switch 8 is opened and until the relay 9 is deenergized prior to the deenergization of the relay 11 in passing from automatic control to manual control by the opening of the manual switch 8.

With the condition of the circuits as described for obtaining automatic operation, the control is responsive to change of voltage of the load circuit, change of load and change of power factor of the load for delivering an exciting current to the field winding of the generator depending upon the change of any one or more of these controlling factors. The current delivered to the field winding of the generator by the rectifier 15 is dependent upon the voltage of the alternating current supplied to this rectifier. This voltage is the resultant of the voltage derived from the current transformer 4 and impedance device 5 and the voltage derived from the secondary winding 10 as modified by the reactor 12, it being remembered that the secondary winding 10 is connected in series with the current transformer 4 and impedance device 5 in the circuit supplying current to the rectifier 15. The purpose of the reactor 12 with its controlling windings considered by themselves is to amplify any change of voltage of the load circuit and vary the voltage applied to the rectifier 15 accordingly.

The purpose of the impedance device 5, as already explained, is to adjust the phase of the electromotive force delivered from the current transformer 4 and the impedance device 5 in order to have a proper relation to the phase of the electromotive force derived from the secondary winding 10. If the latter electromotive force be indicated by E and the electromotive force delivered from the current transformer and impedance device 5 be indicated by $E^1$, the vector sum of these electromotive forces should be less when the power factor of the load circuit is unity than when the power factor is low due to a lagging load current; and the vector sum should be greater when the power factor is unity than when the power factor is low due to a leading load current. Adjustment of the impedance device 5 is made such that the electromotive force $E^1$ is out of phase with the electromotive force E considerably when the power factor of the load circuit is unity. If this out-of-phase relationship of the electromotive forces be assumed as 90° under unity power factor conditions, then it is obvious that the vector sum will have a value determined by that relationship; and under such conditions a corresponding resultant electromotive force will be supplied to the rectifier 15, which in turn will supply a corresponding current to the field winding of the generator. This may be considered to fulfill the requirement of normal field excitation under unity power factor conditions.

When the power factor of the load circuit decreases from unity due to a lagging load current, the phase of the electromotive force $E^1$ is caused to shift from its 90° relationship toward the phase of the electromotive force E. This results in increasing the vector sum of these electromotive forces; and the greater the lag of the load current the more nearly the phase of $E^1$ will approach the phase of E. The vector sum of these electromotive forces accordingly increases under such conditions the more the power factor decreases from unity, with the result that under low power factor conditions of the load circuit due to a lagging current, the resultant electromotive force supplied to the rectifier 15 is very considerably increased compared with that supplied under unity power factor conditions. This results in the current supplied to the field winding of the generator being gradually increased as the power factor decreases under increase of lagging current and in supplying a very considerably increased current to the field winding when it is most needed to maintain the generator voltage.

When the power factor of the load circuit decreases from unity due to a leading load current, the phase of the electromotive force $E^1$ is caused to shift from its 90° relationship away from the phase of the electromotive force E. This results in decreasing the vector sum of these electromotive forces; and the greater the lead of the load current the more the phase of $E^1$ departs from the phase of E. The vector sum of these electromotive forces accordingly decreases under such conditions the more the power factor decreases from unity, with the result that under low power factor conditions of the load circuit due to a leading current the resultant electromotive force supplied to the rectifier 15 is decreased compared with that supplied under unity power factor conditions. This results in the current supplied to the field winding of the generator being gradually decreased as the power factor decreases under increase of leading current. This fulfills the required control of the field current because the generator requires less and less field excitation for maintaining its normal voltage as the lead of the load current increases.

It is not necessary that the phase difference between the controlling electromotive forces be 90° when the power factor of the load is unity but such approximate relationship is desirable in most cases, but, of course, this relationship may be adjusted for adaptation to particular conditions and to particular requirements. The current transformer 4 not only serves to shift the phase of the electromotive force $E^1$ under power factor changes but also controls the magnitude of the electromotive force $E^1$ in accordance with the change of load. This gives an increased excitation to the field of the generator as the load increases.

In addition to the controlling actions just described, the field strength of the generator is increased upon the occurrence of a small decrease in the line voltage from normal conditions and is decreased upon the occurrence of a small increase above the normal line voltage by the action of the potential transformers and the reactor 12. When the line voltage decreases, the voltage of the secondary winding 10 likewise decreases which would tend to decrease the current supplied to the field winding of the generator. However such decrease is more than counter-acted by the influence of the secondary winding 16 and inductive device 17 upon the rectifier 18 and control winding 19 of the reactor. Any decrease in the line voltage results in a more than proportional decrease in the current delivered to the rectifier 18 due to the fact that the inductive device 17 is worked in a region below the knee of the magnetization curve. This amplified decrease of current supplied to the rectifier 18 results in correspondingly decreasing the current supplied to the control winding 19 of the reactor. On account of the magnetizing force of the current of this winding bucking the magnetizing force of the currents of the windings 13 and 13a, the resultant flux of the reactor is increased. This increases the current supplied to the rectifier 15 and to the field winding of the generator which tends to restore the voltage of the line circuit to the required amount. Upon increase of the line voltage the reverse effect takes place.

As regards the effect of the current supplied to the winding 23 by the rectifier 22, any decrease of the line voltage would tend to decrease the excitation of the generator field but this action is more than offset by the change of flux of the reactor as controlled by the winding 19. As already stated, the main function of the potential transformer 20, 21, rectifier 22 and winding 23 is to maintain the magnetization of the core of the reactor in a region below the knee of the magnetization curve so that the effect of the amplified changes in the winding 19 under comparatively small changes of line voltage, will have a pronounced effect in the change of magnetization of the reactor core and thereby pronouncedly affect the value of the electromotive force E and thereby tend to maintain the line voltage within close limits of the required value.

The relative influence of the different controlling factors may be controlled by adjustment of the various means already described and proper proportional designing of the parts so as to maintain a substantially constant line voltage under changes of load, power factor, speed of the generator or other variable conditions. If desired, adjustments could be made for obtaining any desired compounding under varying load conditions.

It will be understood that Fig. 1 is diagrammatic and that various forms and types of the different controlling devices may be utilized according to particular requirements and preferences of the designer. Likewise instead of exciting the field winding of the generator directly by the controlling apparatus as described, the same may be applied to control the field winding of an exciter which in turn will supply current to the field winding of the main generator.

Although Fig. 1 shows one application of the invention to a single phase system, it may be applied similarly to a three-phase system. Fig. 2 shows another way of applying the invention to a three-phase generator 27 having a field winding 28. Here the current transformer 4 is applied to one of the three-phase lines and the primaries 6 and 26 of the potential transformers are connected across the other two phases of the line when the switch 8 is closed. Instead of utilizing an inductive device connected across the terminals of the current transformer as in Fig. 1, an adjustable resistive device 29 is shown connected across the terminals of the current transformer in Fig. 2. In the latter case a proper phase relation of the electromotive force $E^1$ to that of the electromotive force E may be obtained in this manner because the phase of the current in one of the three-phase supply lines is approximately in quadrature to the phase of the electromotive force across the other two of the three-phase supply lines under unity power factor conditions. In Fig. 2 the parts and connections corresponding to those of Fig. 1 are designated by the same reference characters and the parts of the diagram omitted from Fig. 2 would be the same as already described with reference to Fig. 1 and need not be duplicated. The mode of operation of the apparatus of Fig. 2 and its indicated control circuits is similar to that already described with reference to Fig. 1, it being understood that the phase of the electromotive force $E^1$ derived from the current transformer 4 and impedance device 29 is considerably displaced from that of the electromotive force E under unity power factor conditions; and that as the power factor decreases, the phase of the electromotive force $E^1$ is gradually changed so that the electromotive force $E^1$ becomes more and more additive to the electromotive force E in the case of a lagging current and more and more in opposition in the case of a leading current.

Various other adaptations and modifications of the invention may be made according to particular requirements and various types of devices used in various relationships for securing the objects of the invention without departing from the scope thereof.

I claim:

1. Controlling apparatus for an alternating current generator comprising a current transformer related to the load circuit of the generator for deriving therefrom an electromotive force variable with the load and variable in phase with the phase of the load current, means for deriving from the load circuit an electromotive force having its phase dependent upon the phase of the electromotive force of the load circuit, a circuit in which said current transformer is directly connected and in which said derived electromotive forces are combined according to their vector sum, a reactor having a winding connected in series in said circuit, an additional winding on said reactor for affecting the flux thereof and responsive to change of voltage of the generator, rectifying means connected in said circuit, and means for applying the output of said rectifying means to control the voltage of the generator.

2. Controlling apparatus for an alternating current generator comprising a current transformer related to the load circuit of the generator for deriving therefrom an electromotive force variable with the load and variable in phase with the phase of the load current, means for deriving from the load circuit an electromotive force having its phase dependent upon the phase of the electromotive force of the load circuit, a circuit in which said current transformer is directly connected and in which said derived electromotive forces are combined according to their vector sum, a reactor having a winding connected in series in said circuit, an additional winding on said reactor, means for applying a direct current to said additional winding responsive to change of voltage of the generator, the magnetizing force of the current of said additional winding being in opposition to the magnetizing force of the current of said first named reactor winding, rectifying means connected in said circuit, and means for applying the output of said rectifying means to control the voltage of the generator.

3. Controlling apparatus for an alternating current generator comprising a current transformer related to the load circuit of the generator for deriving therefrom an electromotive force variable with the load and variable in phase with the phase of the load current, means for deriving from the load circuit an electromotive force having its phase dependent upon the phase of the electromotive force of the load circuit, a circuit in which said current transformer is directly connected and in which said derived electromotive forces are combined according to their vector sum, a reactor having a plurality of windings connected in series in said circuit, an additional winding on said reactor for affecting the flux thereof and responsive to change of voltage of the generator, rectifying means connected in said circuit, additional rectifiers respectively connected in series with said plurality of windings for supplying an alternating current to said rectifying means, and means for applying the output of said rectifying means to control the voltage of the generator.

JOHN F. HYSLER.